United States Patent
Zhang et al.

(10) Patent No.: US 12,027,905 B2
(45) Date of Patent: Jul. 2, 2024

(54) METHOD AND APPARATUS FOR CHARGING, DEVICE, AND STORAGE MEDIUM

(71) Applicant: GUANGDONG OPPO MOBILE TELECOMMUNICATIONS CORP., LTD., Dongguan (CN)

(72) Inventors: Jun Zhang, Dongguan (CN); Hongbin Xie, Dongguan (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 490 days.

(21) Appl. No.: 17/497,181

(22) Filed: Oct. 8, 2021

(65) Prior Publication Data

US 2022/0029446 A1    Jan. 27, 2022

Related U.S. Application Data

(63) Continuation of application No. PCT/CN2020/089578, filed on May 11, 2020.

(30) Foreign Application Priority Data

May 13, 2019 (CN) .......................... 201910395517.8

(51) Int. Cl.
    *H02J 7/00* (2006.01)
(52) U.S. Cl.
    CPC ...... *H02J 7/007182* (2020.01); *H02J 7/0048* (2020.01); *H02J 7/00714* (2020.01)

(58) Field of Classification Search
    CPC ................................................ H02J 7/007182
    (Continued)

(56) References Cited

U.S. PATENT DOCUMENTS

| 2005/0093517 | A1* | 5/2005 | Suzuki | ............. | H02J 7/007182 |
| | | | | | 320/141 |
| 2009/0091299 | A1 | 4/2009 | Lin et al. | | |

(Continued)

FOREIGN PATENT DOCUMENTS

| CN | 103794827 A | 5/2014 |
| CN | 104965176 A | 10/2015 |

(Continued)

OTHER PUBLICATIONS

Second Office Action from corresponding Chinese Application No. 201910395517.8, dated Jan. 29, 2022. English translation attached.

(Continued)

*Primary Examiner* — Jerry D Robbins
(74) *Attorney, Agent, or Firm* — Sheppard, Mullin, Richter, & Hampton, LLP

(57) ABSTRACT

Embodiments of the present disclosure disclose a method for charging, an apparatus for charging, a device and a storage medium. The method includes determining a degree of change in charging performance of a battery corresponding to a current voltage range when the battery is in a charging state; determining an adjustment amplitude of a current charging current based on the degree of change when the degree of change satisfies a condition; determining a target charging current based on the adjustment amplitude and the current charging current; and charging the battery with the target charging current.

20 Claims, 6 Drawing Sheets

(58) Field of Classification Search
USPC .......................................................... 320/162
See application file for complete search history.

(56) References Cited

U.S. PATENT DOCUMENTS

| | | | |
|---|---|---|---|
| 2012/0019197 A1 | 1/2012 | Lee et al. | |
| 2012/0200266 A1 | 8/2012 | Berkowitz et al. | |
| 2015/0160301 A1* | 6/2015 | Kusano | H02J 7/007184 |
| | | | 320/134 |
| 2015/0280486 A1* | 10/2015 | Hsu | B60L 53/11 |
| | | | 320/145 |
| 2017/0371000 A1 | 12/2017 | Fukushima et al. | |

FOREIGN PATENT DOCUMENTS

| | | |
|---|---|---|
| CN | 105305514 A | 2/2016 |
| CN | 106505695 A | 3/2017 |
| CN | 106505699 A | 3/2017 |
| CN | 107076803 A | 8/2017 |
| CN | 107171380 A | 9/2017 |
| CN | 107196371 A | 9/2017 |
| CN | 107359378 A | 11/2017 |
| CN | 108475935 A | 8/2018 |
| CN | 109672000 A | 4/2019 |

OTHER PUBLICATIONS

Extended European Search Report dated May 11, 2022 received in European Patent Application No. EP20805097.1.
Rejection Decision from corresponding Chinese Application No. 201910395517.8, dated Apr. 28, 2022. English translation attached.
International Search Report and Written Opinion dated Aug. 14, 2020 in International Application No. PCT/ CN2020/089578. English translation attached.
First Office Action from corresponding Chinese Application No. 201910395517.8, dated Aug. 4, 2021. English translation attached.

* cited by examiner

METHOD AND APPARATUS FOR CHARGING, DEVICE, AND STORAGE MEDIUM

CROSS-REFERENCE TO RELATED APPLICATIONS

The present application is a continuation of International Application No. PCT/CN2020/089578 filed on May 11, 2020, which is based on and claims priority to Chinese Patent Application No. 201910395517.8, filed on May 13, 2019, both of which are incorporated herein by reference in their entireties.

TECHNICAL FIELD

Embodiments of the present disclosure relate to the electronic technology, and more particularly, relate to but are not limited to a method for charging, an apparatus for charging, a device and a storage medium.

BACKGROUND

As the number of times the battery is charged increases, the battery gradually ages, its internal resistance value gradually increases, and the actual capacity of the battery gradually decreases. When the battery ages, if the battery is still charged by using a previous charging strategy, a current charging current may exceed an actual charging rate of the battery, accelerating an aging speed of the battery.

SUMMARY

An embodiment of the present disclosure provides a method for charging, an apparatus for charging, a device, and a storage medium, and technical solutions of the embodiments of the present disclosure are implemented as follows.

The method for charging provided by the embodiment of the present disclosure includes: determining a degree of change in charging performance of a battery corresponding to a current voltage range when the battery is in a charging state; determining an adjustment amplitude of a current charging current based on the degree of change when the degree of change satisfies a condition; determining a target charging current based on the adjustment amplitude and the current charging current; and charging the battery with the target charging current.

The apparatus for charging provided by the embodiment of the present disclosure includes: a battery performance determining module configured to determine a degree of change in charging performance of a battery corresponding to a current voltage range when the battery is in a charging state; an adjustment amplitude determining module configured to determine an adjustment amplitude of a current charging current based on the degree of change when the degree of change satisfies a condition; a target charging current determining module configured to determine a target charging current based on the adjustment amplitude and the current charging current; and a charging module configured to charge the battery with the target charging current.

The electronic device provided by the embodiment of the present disclosure includes: a memory and a processor, the memory has a computer program stored thereon, the computer program is executable on the processor, and the processor, when executing the computer program, implements steps of the method for charging according to the embodiment of the present disclosure.

A computer-readable storage medium provided by the embodiment of the present disclosure, having a computer program stored thereon, wherein the computer program, when executed by a processor, implements steps of the method for charging according to the embodiment of the present disclosure.

In the embodiments of the present disclosure, the degree of change in charging performance of the battery corresponding to the current voltage range is determined when the battery is in the charging state. When the degree of change satisfies the condition, the current charging current is adjusted based on the degree of change, so that the adjusted charging current does not exceed an actual charging rate of the battery, thereby slowing down an aging speed of the battery.

DESCRIPTION OF EMBODIMENTS

In order to make the objects, technical solutions, and advantages of the present disclosure clearer, the technical solutions of the present disclosure will be described below in detail with reference to the accompanying drawings in embodiments of the present disclosure. The following examples are used to illustrate the present disclosure, but are not intended to limit the scope of the present disclosure.

Unless defined otherwise, all technical and scientific terms used herein have the same meanings as commonly understood by those skilled in the art of the present disclosure. Terms used in the specification of the present disclosure herein are only for the purpose of describing specific embodiments, and are not intended to limit the present disclosure.

In the following description, reference is made to "some embodiments" which describe a subset of all possible embodiments, but it is understood that "some embodiments" may be the same subset or different subsets of all possible embodiments, and may be combined with each other without conflict.

It should be noted that the terms "first", "second" and "third" referred to in the embodiments of the present disclosure are only used for distinguishing similar objects and do not represent a specific order of the objects, and it should be understood that "first", "second" and "third" may be interchangeable in a specific sequence or a precedence sequence, so that the embodiments of the present disclosure described herein can be implemented in an order other than that shown or described herein.

An embodiment of the present disclosure provides a method for charging, which can be applied in an electronic device with a rechargeable battery. For example, the electronic device is a mobile terminal such as a mobile phone, a tablet computer, a notebook computer, an electronic book and the like, or an electric automobile, an electric bicycle, an unmanned aerial vehicle, a mobile power supply, an electronic cigarette, a watch, a bracelet, smart glasses, a sweeping robot, a wireless earphone, a Bluetooth sound box, an electric toothbrush, a rechargeable wireless mouse or the like, that is, in the embodiments of the present disclosure, the product form of the electronic device is not limited.

Figure 1:
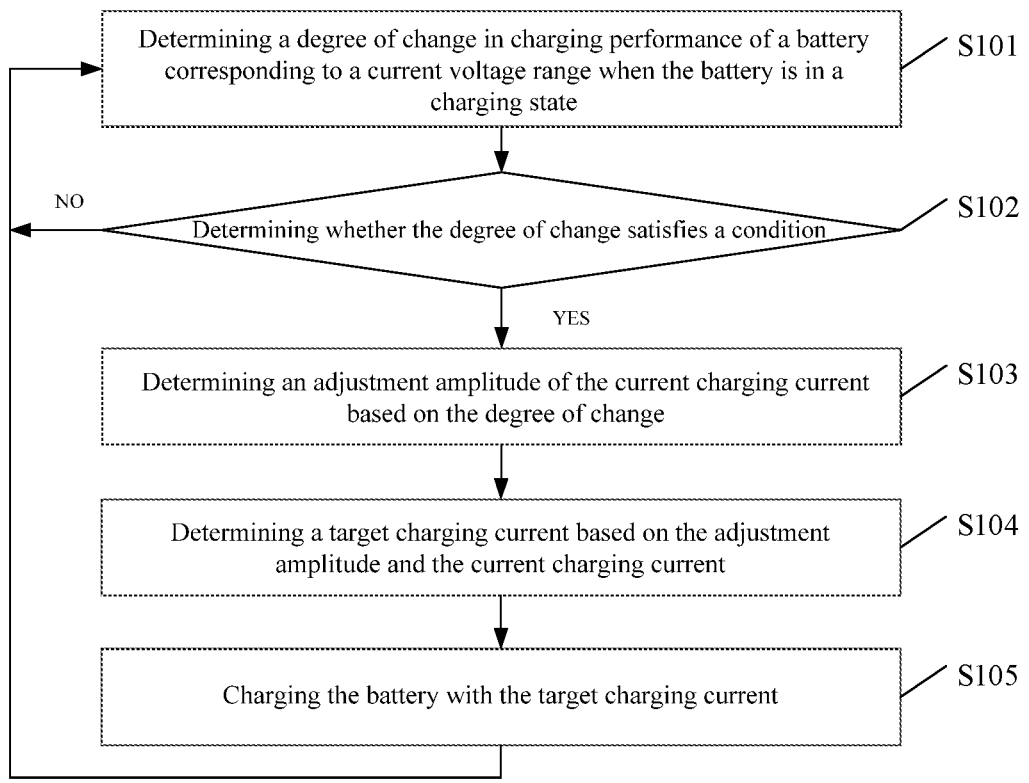
FIG. 1 is a flowchart illustrating an implementation process of a method for charging according to an embodiment of the present disclosure.

FIG. 1 is a flowchart illustrating an implementation process of a method for charging according to an embodiment of the present disclosure, and as illustrated in FIG. 1, the method includes the following steps:

In step S101, a degree of change in charging performance of a battery corresponding to a current voltage range is determined when the battery is in a charging state.

Generally, the charging performance of the battery corresponding to the current voltage range can be characterized by an amount of charges, with which the battery is charged within the current voltage range. It is understood that since the battery has chemical characteristics, the charging performance of the battery is affected by an external environment (e.g., temperature), the number of times the battery has been charged, and other factors. With different external environments and different numbers of times of charging, the amount of charges, with which the battery is charged in a same voltage range are different. That is, in a process of charging for multiple times, the charging performance of the battery corresponding to the same voltage range varies. Based on this, the degree of change in the charging performance of the battery corresponding to the current voltage range is determined in step S101, so that a current charging current can be adjusted in real time during charging of the battery to enable the adjusted charging current to conform to the charging performance of the battery corresponding to a next voltage range (i.e., a next charging cycle).

It can be understood that, when the battery is in a constant current charging stage, the battery is always charged with a fixed current, and when the battery ages in the charging process, if the battery is still charged with the fixed current, over-rate charging may be caused. Here, the degree of change of the charging performance of the battery corresponding to each voltage range is calculated in real time so as to correspondingly adjust the charging current, which solves a problem of battery aging caused in the constant current charging stage.

In the embodiment of the present disclosure, an interval of the current voltage range is not limited, for example, the interval of the current voltage range is 0.1 Volt (V). When implemented, the battery at least includes one battery cell; and when the battery includes two or more battery cells, the cells may be connected in parallel or in series.

In step S102, whether the degree of change satisfies a condition is determined; if yes, step S103 is performed; and if no, the battery is still charged with the current charging current, and the step S101 is re-executed.

In step S103, an adjustment amplitude of the current charging current is determined based on the degree of change.

Here, the degree of change may be characterized by a change relationship between a first amount of charges, with which the battery is charged within the current voltage range relative to a preset reference amount of charges. For example, in step S303 of an aftermentioned embodiment, a determined first change amount is used as the degree of change. Alternatively, in step S404 of an aftermentioned embodiment, a determined second change amount is used as the degree of change. The condition may be preset, for example, the condition is that the degree of change is greater than a preset threshold.

It is understood that the battery has chemical characteristics, and the charging performance of the battery is susceptible to the external environment, the number of times of charging and other factors, i.e., an actual capacity of the battery may be larger or smaller than a rated capacity. For example, in such a high-temperature environment as summer, the actual capacity of the battery is generally larger than the rated capacity; in such a low-temperature environment as winter, the actual capacity of the battery is generally smaller than the rated capacity. Therefore, when step S102 is performed, and the degree of change indicates an enhancement of the charging performance of the battery, the adjustment amplitude of the current charging current is determined as an enhancement amplitude based on the degree of change. In this way, by enhancing the current charging current, the charging speed can be increased under the premise that the charging current is lower than the current charging rate of the battery. Otherwise, when the degree of change indicates a reduction of the charging performance of the battery, the adjustment amplitude of the current charging current is determined as a reduction amplitude based on the degree of change. In this way, by reducing the current charging current, an over-rate charging can be prevented, thereby slowing down the aging speed of the battery.

In step S104, a target charging current is determined based on the adjustment amplitude and the current charging current.

When this step is implemented, the current charging current can be adjusted in accordance with the adjustment amplitude. For example, if the adjustment amplitude is +4%, the target charging current is the current charging current*(1+4%); if the adjustment amplitude is −6%, the target charging current is the current charging current*(1−6%). For example, if the adjustment amplitude is +0.2 ampere (A), the target charging current is (the current charging current+0.2 A); Alternatively, if the adjustment amplitude is −0.2 A, the target charging current is (the current charging current −0.2 A).

In step S105, the battery is charged with the target charging current, and the method returns to execute step S101.

In fact, the electronic device charges the battery with the target charging current in the next voltage range.

In the embodiment of the present disclosure, the degree of change in charging performance of the battery corresponding to the current voltage range is determined when the battery is in the charging state; when the degree of change satisfies a condition, the current charging current is adjusted based on the degree of change so that the adjusted charging current is smaller than or equal to the actual charging rate of the battery. Thus, the charging speed can be increased by increasing the current charging current under a condition that the charging performance of the battery is enhanced; and in addition, the aging speed of the battery can be slowed down by reducing the current charging current under a condition that the charging performance of the battery is reduced.

Figure 6:
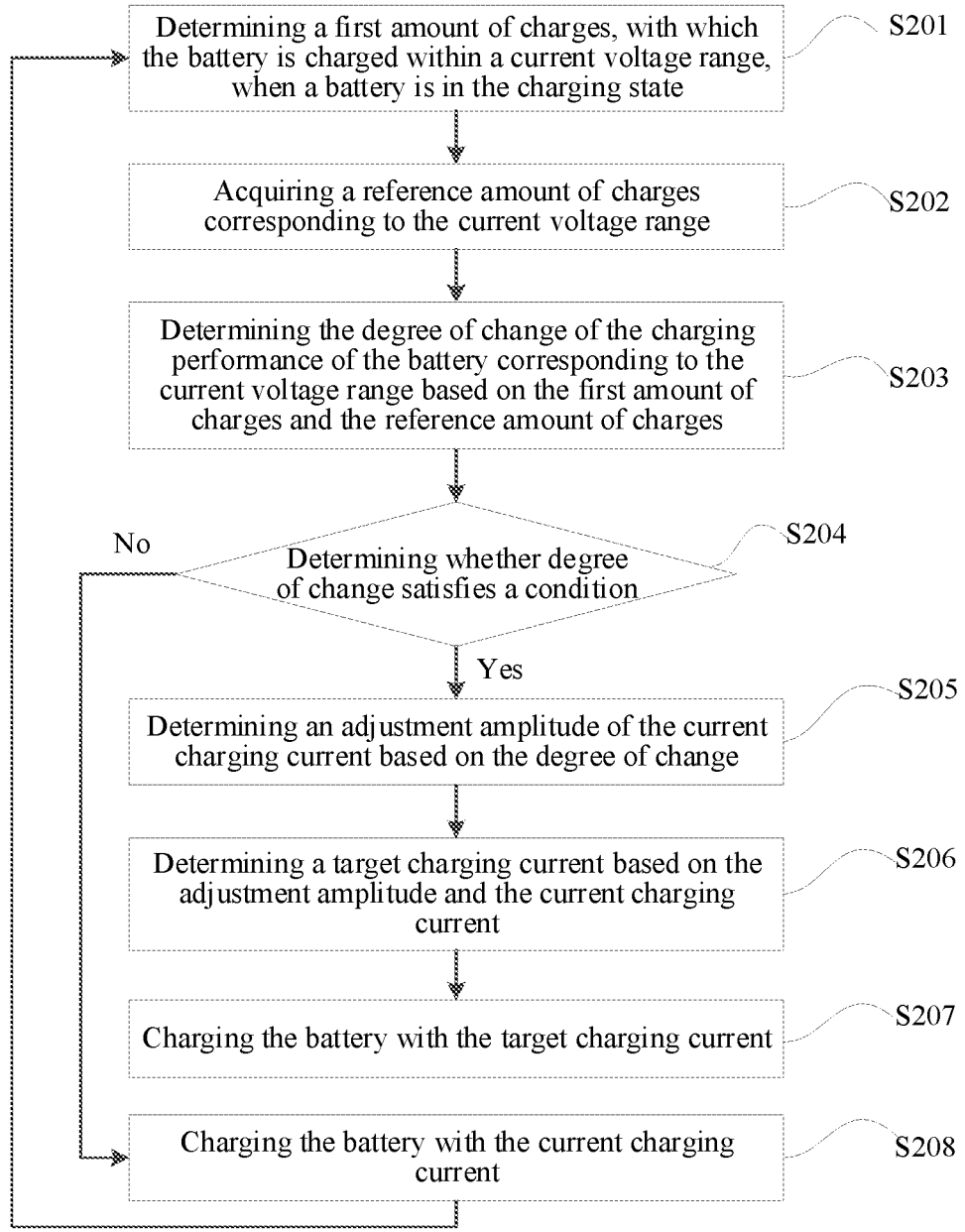
FIG. 6 is a schematic diagram illustrating a method for charging according to an embodiment of the present disclosure.

An embodiment of the present disclosure provides another method for charging, as illustrated in FIG. 6. The method includes the following steps S201 to S208.

In step S201, when a battery is in the charging state, a first amount of charges, with which the battery is charged within a current voltage range, is determined.

It should be noted that the method for charging provided by this embodiment of the present disclosure may solve a problem of battery aging caused by a constant current charging stage in any method for charging. For example, the method for charging including the constant current charging stage is a constant current-constant voltage (CCCV) method for charging, a step method for charging, or the like.

In a common method for charging, a charging strategy to be used in the next charging is generally determined according to the state of health of the battery. For example, when the number of times the battery is fully charged by a terminal is N, the terminal determines the battery capacity of the battery, and determines the current and voltage for the next charging according to the battery capacity. In this way, by performing voltage reduction and current limiting of different degrees at proper time for the charging of the battery, the service life of the battery can be prolonged, and the aging speed of the battery can be slowed down. However, the determined current and voltage are not necessarily suitable for the current charging performance of the battery during the next charging, aging of the battery may still occur during charging, and the aging becomes more apparent especially after the battery has been used for a long time, in the case of which, if the battery is still charged in accordance with the charging strategy determined previously, there may be a risk of over-rate charging and accelerating the aging speed of the battery. In the embodiment of the present disclosure, the determination of the charging performance of the battery and the adjustment of the charging current are performed throughout the whole charging process. That is, a first amount of charges, with which the battery is charged within the current voltage range, is determined, and the current charging current is adjusted in real time in the subsequent procedure, so that the problem of over-rate charging caused by aging of the battery in the charging process can be solved, and the aging speed of the battery is slowed down.

In step S202, a reference amount of charges corresponding to the current voltage range is acquired.

Theoretically, when a battery is charged with a constant current under the condition that the charging performance of the battery is stable, the amount of charges, with which the battery is charged in the same voltage range, should be identical. Here, in order to reduce the error, the reference amount of charges corresponding to a voltage range identical with the current voltage range is acquired. For example, when the current voltage range is [3.4V, 3.5V], and when step S202 is implemented, the reference amount of charges corresponding to [3.4V, 3.5V] is acquired.

It should be noted that the reference amount of charges may be a rated value, or an amount of charges corresponding to the voltage range in the historical charging process.

In step S203, the degree of change of the charging performance of the battery corresponding to the current voltage range is determined based on the first amount of charges and the reference amount of charges.

When this step is implemented, the degree of change may be determined by determining a change amount of the first amount of charges relative to the reference amount of charges.

In step S204, whether the degree of change satisfies a condition is determined; if yes, step S205 is performed; and if no, step S208 is performed.

In step S205, an adjustment amplitude of the current charging current is determined based on the degree of change.

In step S206, a target charging current is determined based on the adjustment amplitude and the current charging current.

In step S207, the battery is charged with the target charging current.

In step S208, the battery is charged with the current charging current, and the method returns to execute step S201.

In the embodiment of the present disclosure, when the battery is in the charging state, the first amount of charges, with which the battery is charged within the current voltage range, is determined, and the degree of change of the charging performance of the battery corresponding to the current voltage range is determined based on the first amount of charges and the reference amount of charges corresponding to the voltage range. In this way, the degree of change can be determined efficiently and accurately, and when the degree of change satisfies the condition, the current charging current can be adjusted in time.

Figure 7:
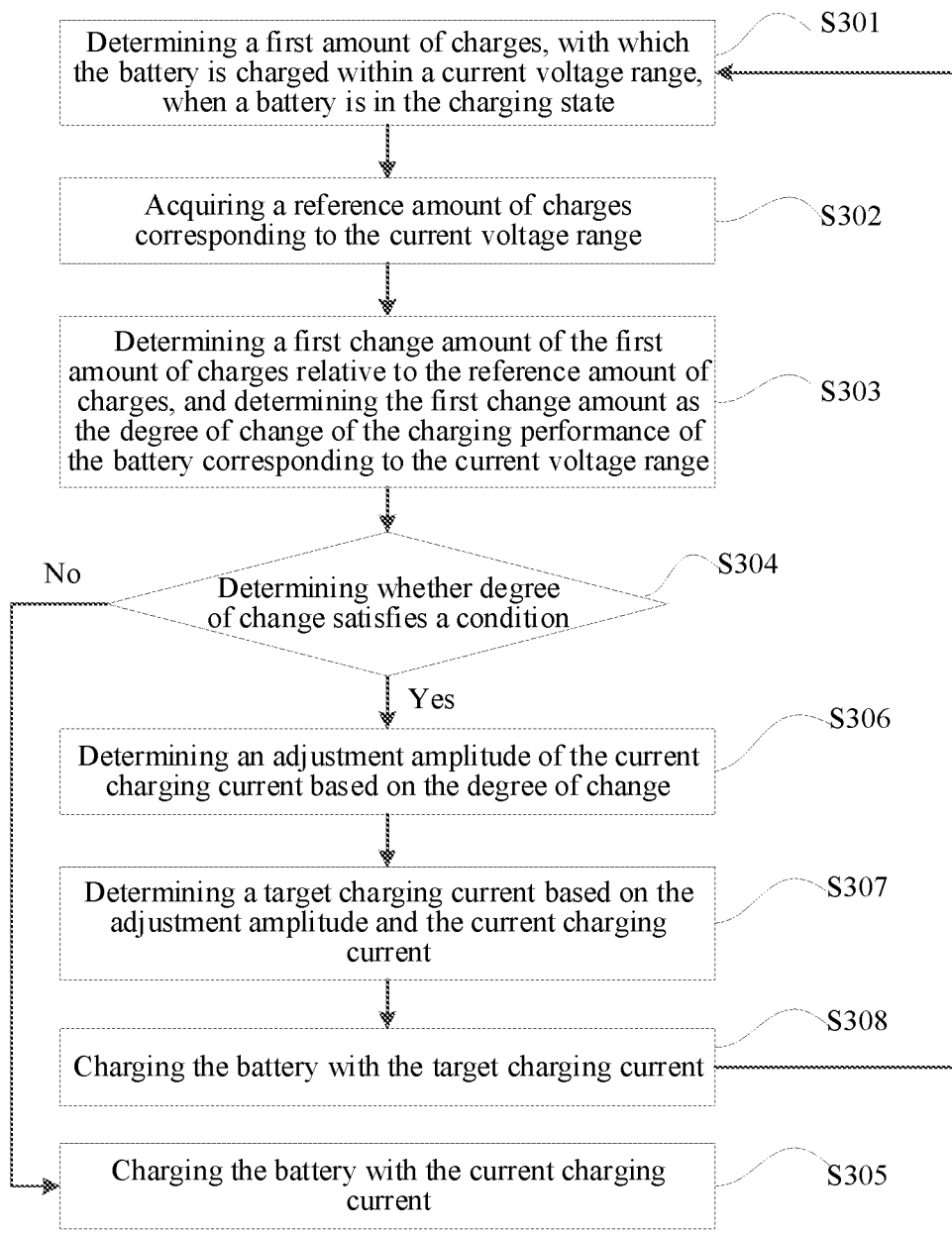
FIG. 7 is a schematic diagram illustrating a method for charging according to an embodiment of the present disclosure.

An embodiment of the present disclosure provides still another method for charging, as illustrated in FIG. 7. The method includes the following steps S301 to S308.

In step S301, when a battery is in a charging state, a first amount of charges, with which the battery is charged within a current voltage range, is determined.

In step S302, a reference amount of charges corresponding to the current voltage range is acquired.

Figure 2:
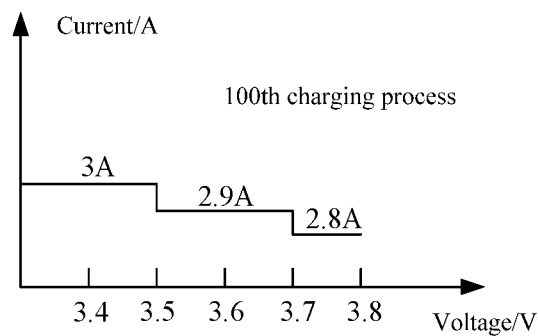
FIG. 2 is a schematic diagram illustrating a method for setting a reference amount of charges according to an embodiment of the present disclosure.
Figure 2:
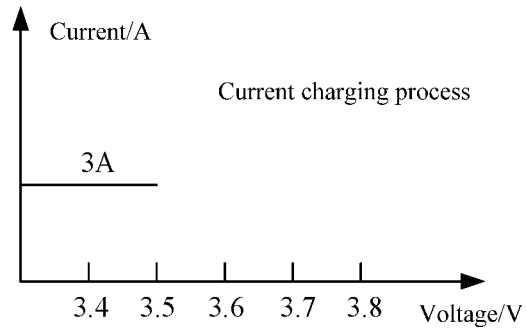

Here, the reference amount of charges may be set in advance before step S301 is performed. When this step is implemented, a first rated amount of charges corresponding to the voltage range is set as the reference amount of charges; or a third amount of charges, with which the battery is charged within the voltage range in a historical charging process is set as the reference amount of charges. For example, the amount of charges, with which the battery is charged within the voltage range when the battery is charged for the first time, is set as the reference amount of charges. For example, the amount of charges, with which the battery is charged within the voltage range during a historical charging process of a latest current adjustment, are set as the reference amount of charges. As illustrated in FIG. 2, assuming that in the 100th charging, the battery is charged with an initial current of 3 A when the battery charging is started; when the voltage reaches 3.5V, one current adjustment is performed, and the charging is continued with a current of 2.9 A; and when the voltage reaches 3.7V, one current adjustment is performed again, and the charging is continued with a current of 2.8 A. Assuming that the current charging process is the 101th charging, since the historical charging process of the latest current adjustment is the 100th charging, taking the current voltage range being [3.4V, 3.5V] as an example, the corresponding reference amount of charges is an amount of charges, with which the battery is charged within the voltage range [3.4V, 3.5V] in the 100th charging.

It should be noted that the initial charging strategy of the current charging process should be the same as the charging strategy of the charging process corresponding to the reference amount of charges. Still taking the above example for illustration, as shown in FIG. 2, assuming that the current charging process is the 101th charging, the battery is charged with an initial current of 3 A during charging.

In step S303, a first change amount of the first amount of charges relative to the reference amount of charges is determined, and the first change amount is determined as the degree of change of the charging performance of the battery corresponding to the current voltage range.

A form of representation of the first change amount is not limited herein. For example, the first change amount may be a difference of the first amount of charges relative to the reference amount of charges. The difference greater than 0 indicates that the charging performance of the battery corresponding to the current voltage range is enhanced; and the difference smaller than 0 indicates that the charging performance of the battery corresponding to the current voltage range is reduced. Alternatively, the first change amount may be a ratio of the difference to the reference amount of charges.

In step S304, whether the degree of change satisfies a condition is determined; if yes, step S306 is performed; and if no, step S305 is performed.

Taking the degree of change being a difference of the first amount of charges relative to the reference amount of charges as an example, that the degree of change does not satisfy the condition is determined when an absolute value of the difference is smaller than or equal to a first threshold, and at this time, the battery is charged with the current charging current in a next voltage range; that the degree of change satisfies the condition when the absolute value of the difference is greater than the first threshold, and at this time, the adjustment amplitude of the current charging current may be determined according to a preset adjustment rule. For example, the adjustment amplitude of the current charging current corresponding to the degree of change may be determined according to a mapping relationship between the degree of change and the adjustment amplitude shown in Table 1. As can be seen from Table 1, different degrees of change correspond to different adjustment amplitudes. For example, when the degree of change is −150 milliampere hours (mAh), the corresponding range is [−200 mAh, −100 mAh), and therefore the corresponding adjustment amplitude is −0.2 A, i.e., the obtained target charging current is (the current charging current −0.2 A). In another example, the degree of change is 80 mAh, its corresponding a range is [0 mAh, 100 mAh), and thus the corresponding adjustment amplitude is 0.1 A, i.e., the obtained target charging current is (current charging current+0.1 A).

Table 1

TABLE 1

| Range to which a degree of change d1 belongs | Adjustment amplitude |
|---|---|
| . . . | . . . |
| [−200 mAh, −100 mAh) | −0.2 A |
| [−100 mAh, 0 mAh) | −0.1 A |
| [0 mAh, 100 mAh) | 0.1 A |
| [100 mAh, 200 mAh) | 0.2 A |
| . . . | . . . |

When the first change amount is a ratio of the difference to the reference amount of charges, that is, the degree of change is the ratio, that the degree of change does not satisfy the condition is determined when the absolute value of the ratio is smaller than or equal to a second threshold; otherwise, that the degree of change satisfies the condition is determined when the absolute value of the ratio is greater than the second threshold, and at this time, the adjustment amplitude of the current charging current may be determined according to the preset adjustment rule. The adjustment rule may be that the adjustment amplitude is equal to the ratio. For example, when the ratio is −0.02, the adjustment amplitude may also be −0.02, and accordingly, the target charging current is the current charging current*(1−0.02). Alternatively, the adjustment amplitude may be larger or smaller than the ratio.

In step S305, the battery is charged with the target charging current.

In step S306, the adjustment amplitude of the current charging current is determined based on the degree of change.

With the implementation of this step, when the degree of change indicates an enhancement of the charging performance of the battery, an enhancement amplitude of the current charging current is determined based on the degree of change. It is understood that the charging performance of the battery is influenced by an external environment (such as temperature), the number of times of charging and other factors, the actual capacity of the battery may be larger than the rated capacity. Thus, when the degree of change indicates the enhancement of the charging performance of the battery, the current charging current may be increased, thereby increasing the charging speed of the battery.

On the contrary, when the degree of change indicates a reduction of the charging performance of the battery, a reduction amplitude of the current charging current is determined based on the degree of change. In this case, the over-rate charging can be prevented so as to reduce the aging speed of the battery by reducing the current charging current.

In Step S307, a target charging current is determined based on the adjustment amplitude and the current charging current.

In step S308, the battery is charged with the target charging current, and the method returns to execute step S301.

In the embodiment of the present disclosure, when the battery is in the charging state, the first amount of charges, with which the battery is charged within the current voltage range, is determined, and the reference amount of charges corresponding to the voltage range is acquired; the first change amount of the first amount of charges relative to the reference amount of charges is determined, the first change amount is determined as the degree of change of the charging performance of the battery corresponding to the current voltage range, and the adjustment amplitude of the current charging current is determined based on the degree of change. In this way, by comparing the first amount of charges and the reference amount of charges corresponding to the same voltage range, an error of the first change amount can be reduced, and an adjustment accuracy of the current charging current can be improved.

Figure 8:
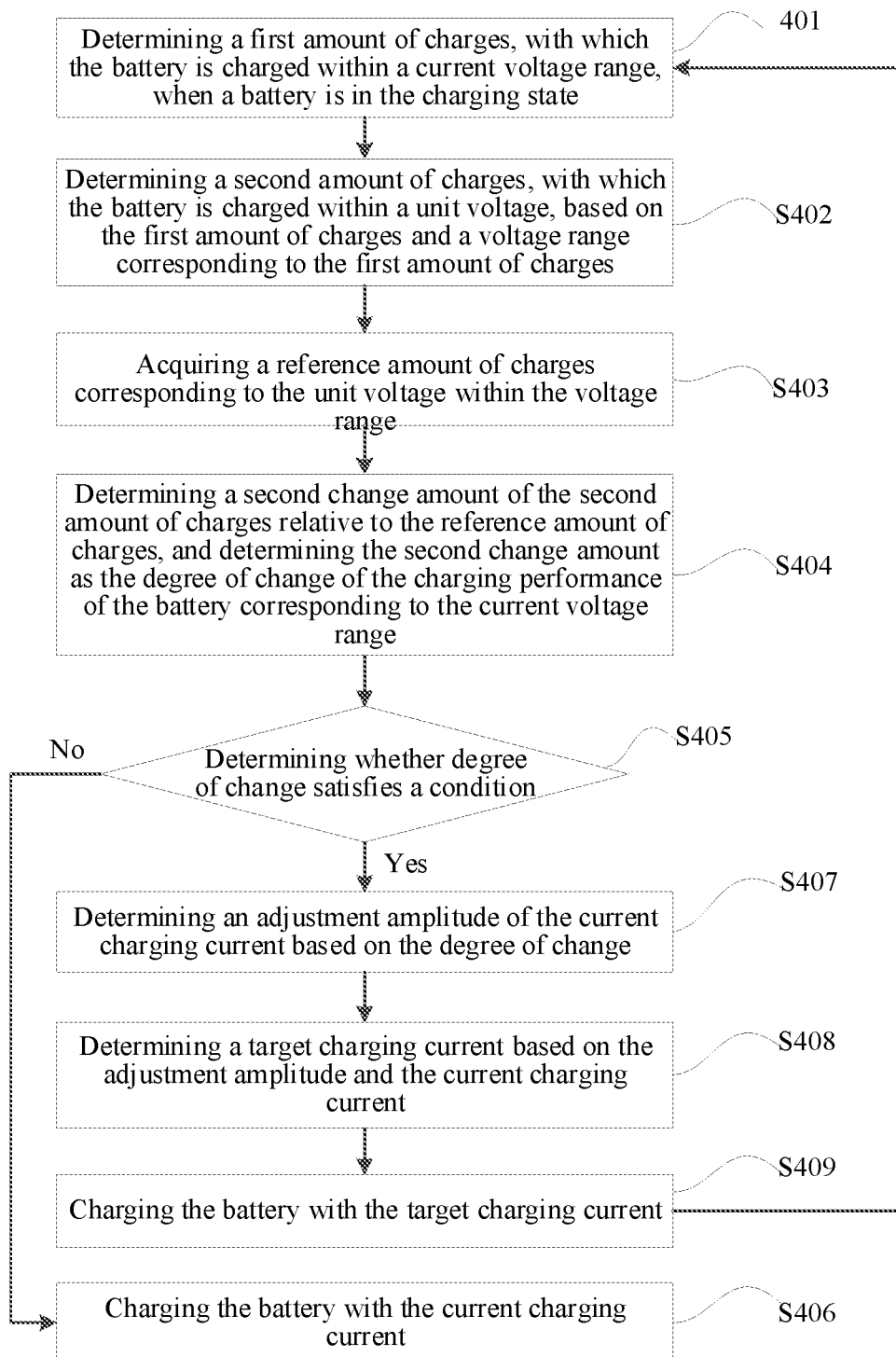
FIG. 8 is a schematic diagram illustrating a method for charging according to an embodiment of the present disclosure.

An embodiment of the present disclosure provides yet another method for charging, as illustrated in FIG. 8. The method includes the following steps S401 to S409.

In step S401, when a battery is in a charging state, a first amount of charges, with which the battery is charged within a current voltage range, is determined.

In step S402, a second amount of charges, with which the battery is charged within a unit voltage, is determined based on the first amount of charges and a voltage range corresponding to the first amount of charges.

In fact, the second amount of charges is equal to the first amount of charges divided by the interval of the current voltage range. For example, the first amount of charges is 100 mAh, the current voltage range is [3.4V, 3.5V], the interval of the current voltage range is 0.1V, and then the second amount of charges is 1000 mAh/V (i.e., 100 mAh divided by 0.1V).

In step S403, a reference amount of charges corresponding to the unit voltage within the voltage range is acquired.

Here, the reference amount of charges may be set in advance before step S401 is performed. With the implementation of this step, a second rated amount of charges corresponding to the unit voltage within the voltage range is set as the reference amount of charges. Alternatively, a fourth amount of charges, with which the battery is charged in a unit voltage within the voltage range in a historical charging process, is set as the reference amount of charges. For example, the amount of charges, with which the battery is charged within the unit voltage corresponding to the voltage range when the battery is charged for the first time, is set as the reference amount of charges. In another example, the amount of charges, with which the battery is charged within the unit voltage corresponding to the voltage range during the historical charging process of a latest current adjustment, is set as the reference amount of charges. It should be noted that the initial charging strategy of the current charging process should be the same as the charging strategy of the charging process corresponding to the reference amount of charges.

In step S404, a second change amount of the second amount of charges relative to the reference amount of charges is determined, and the second change amount is determined as the degree of change of the charging performance of the battery corresponding to the current voltage range.

It can be understood that, by determining the degree of change based on the second amount of charges and the reference amount of charges, with each of which the battery is charged within the unit voltage, it is possible to avoid a situation where a large error occurs in the determined first change amount caused when the interval of the voltage range corresponding to the first amount of charges is not consistent with the interval of the voltage range corresponding to the reference amount of charges.

In step S405, whether the degree of change satisfies a condition is determined; if yes, step S407 is performed; and if no, step S406 is performed.

In step S406, the battery is charged with the current charging current.

In step S407, an adjustment amplitude of the current charging current is determined based on the degree of change.

With the implementation of this step, an enhancement amplitude of the current charging current is determined based on the degree of change when the degree of change indicates an enhancement of the charging performance of the battery; and a reduction amplitude of the current charging current is determined based on the degree of change when the degree of change indicates a reduction of the charging performance of the battery.

In step S408, a target charging current is determined based on the adjustment amplitude and the current charging current.

In step S409, the battery is charged with the target charging current, and the method returns to execute step S401.

The prevailing charging mode of the battery mainly includes a CCCV charging mode, a step charging mode and the like, which all charge the battery with a fixed charging current in the constant current charging stage, that is, charging the battery at a same current value from the beginning to the end of charging. For example, in the CCCV charging mode, the terminal charges a new battery with a charging current of 3 A during the constant current charging stage, and the terminal still charges the battery with a charging current of 3 A after the new battery is cyclically charged several hundred times. However, as the battery ages, the capacity of the battery decreases, and if the battery is still charged with the current used when a new battery is initially charged, the current will exceed the current charging rate of the battery, accelerating the aging speed of the battery.

Figure 3:
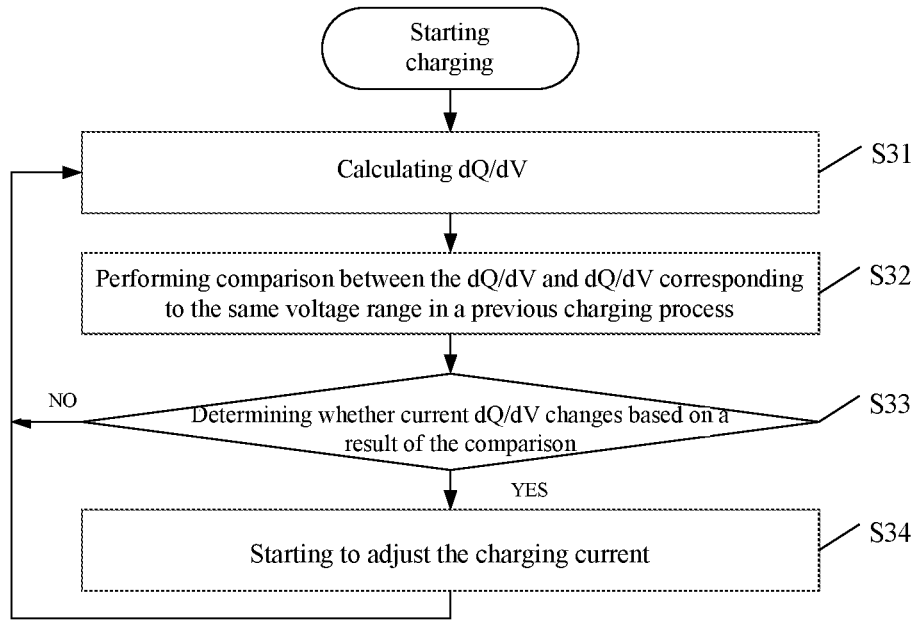
FIG. 3 is a flowchart illustrating another implementation of a method for charging according to another embodiment of the present disclosure.

The embodiment of the present disclosure is realized by internally setting a computing unit in the charging process, namely a built-in dQ/dV, where Q is a charging capacity, V is a voltage, and dQ/dV represents the capacity charged within a unit voltage. By constantly calculating the dQ/dV and comparing it with the initial value (i.e., $dQ_0/dV_0$ when the battery is charged for the first time), if dQ/dV is smaller than the initial value, it indicates that the capacity of the battery is reduced, and the charging current needs to be adjusted. Specifically, when the battery is charged for the first time, the dQ/dV is calculated throughout the whole charging process, and a relationship of dQ/dV-V can be obtained. During the subsequent charging cycles, as illustrated in FIG. 3, the following steps S31 to S34 are included.

In step S31, dQ/dV is calculated.

In step S32, comparison is performed between the dQ/dV and dQ/dV corresponding to the same voltage range in a previous charging process.

In step S33, whether current dQ/dV changes is determined based on a result of the comparison; if yes, step S34 is performed; and if no, return to execute step S31, and the battery is charged with the current charging current.

In step S34, adjustment of the charging current is started, and return to execute step S31. For example, the charging current of the next charging cycle (i.e., the next voltage range) may be adjusted correspondingly in accordance with a decreasing rate of dQ/dV. For example, if dQ/dV is decreased by 5%, the charging current of the next charging cycle is decreased by 5%. Particularly, when the step charging has a plurality of CC charging stages, the charging current of each constant current stage is adjusted based on the change of the dQ/dV value in the corresponding stage.

It should be noted that the corresponding value of dV may be taken as needed. For example, dV takes a fixed value, dV=0.1V; after obtaining the change amplitude of dQ/dV, the charging current may also be adjusted according to specific needs, for example, the charging current is adjusted only when the change amplitude is greater than 1%.

In the embodiment of the present disclosure, the current charging current of the battery is adjusted according to the state information of the battery, and the battery is charged with an optimal charging current, so that the purpose of dynamically adjusting the charging current can be achieved, the aging speed of the battery is reduced to the maximum extent, and over-rate charging after cycles can be avoided.

It should be noted that, since the value of dV can be adjusted as needed, the method for charging provided in the embodiment of the present disclosure can be applied as long as a constant current charging process occurs, e.g., the CC stage of the common CCCV charging process, the constant current process of the step charging process, and each constant current charging process of the super VOOC.

Based on the foregoing embodiments, the present disclosure provides an apparatus for charging. Modules included in the apparatus and units included in each module can be implemented by the processor in a terminal. Of course, the implementation can also be realized through a specific logic circuit. During the implementation, the processor may be a Central Processing Unit (CPU), a Microprocessor (MPU), a Digital Signal Processor (DSP), a Field Programmable Gate Array (FPGA), or the like.

Figure 4:
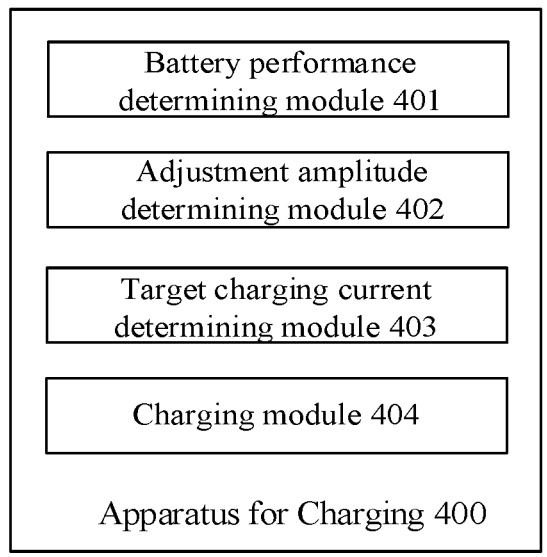
FIG. 4 is a schematic diagram illustrating a structural composition of an apparatus for charging according to an embodiment of the present disclosure.

FIG. 4 is a schematic diagram illustrating a structural composition of an apparatus for charging according to an embodiment of the present disclosure. As illustrated in FIG. 4, the apparatus 400 includes a battery performance determining module 401, an adjustment amplitude determining module 402, a target charging current determining module 403, and a charging module 404.

The battery performance determining module 401 is configured to determine a degree of change in charging performance of a battery corresponding to a current voltage range when the battery is in a charging state.

The adjustment amplitude determining module 402 is configured to determine an adjustment amplitude of a current charging current based on the degree of change when the degree of change satisfies a condition.

The target charging current determining module 403 is configured to determine a target charging current based on the adjustment amplitude and the current charging current.

The charging module 404 is configured to charge the battery with the target charging current.

In other embodiments, the battery performance determining module 401 includes a first determining unit, an obtaining unit, and a second determining unit.

The first determining unit is configured to determine a first amount of charges, with which the battery is charged within the current voltage range.

The obtaining unit is configured to obtain a reference amount of charges corresponding to the voltage range.

The second determining unit is configured to determine the degree of change based on the first amount of charges and the reference amount of charges.

In other embodiments, when the reference amount of charges is a reference amount of charges corresponding to the voltage range, the second determining unit is configured to determine a first change amount of the first amount of charges relative to the reference amount of charges, and determine the first change amount as the degree of change.

In other embodiments, when the reference amount of charges is a reference amount of charges corresponding to a unit voltage within the voltage range, the second determining unit is configured to determine a second amount of charges, with which the battery is charged within a unit voltage based on the first amount of charges and a voltage range corresponding to the first amount of charges, determine a second change amount of the second amount of charges relative to the reference amount of charges, and determine the second change amount as the degree of change.

In other embodiments, the adjustment amplitude determining module 402 is configured to determine an enhancement amplitude of the current charging current based on the degree of change when the degree of change indicates an enhancement of the charging performance of the battery, and determine a reduction amplitude of the current charging current based on the degree of change when the degree of change indicates a reduction of the charging performance of the battery.

In other embodiments, the apparatus further includes a reference charge amount setting module 505. The module 505 is configured to set a first rated amount of charges corresponding to the voltage range as the reference amount of charges; or set a second rated amount of charges corresponding to a unit voltage within the voltage range as the reference amount of charges.

In other embodiments, the reference charge amount setting module 505 is configured to set a third amount of charges, with which the battery is charged within the voltage range during a historical charging process, as the reference amount of charges; or set a fourth amount of charges, with which the battery is charged within a unit voltage within the voltage range during the historical charging process, as the reference amount of charges.

The above description of the apparatus embodiments, similar to the above description of the method embodiments, has similar beneficial effects as the method embodiments. For technical details not disclosed in the embodiments of the apparatus of the present disclosure, reference is made to the description of the method embodiments of the present disclosure for understanding.

It should be noted that, in the embodiments of the present disclosure, when the method for charging as described above is implemented in the form of a software functional module and sold or used as a standalone product, it can be stored in a computer-readable storage medium. Based on this understanding, the technical solutions of the embodiments of the present disclosure, or the part thereof that contributes to the related art, can be embodied in the form of a software product. The computer software product may be stored in a storage medium and contain instructions to enable an electronic device with rechargeable battery (such as a mobile phone, a tablet computer, a laptop, an e-book, an electric vehicle, an electric bicycle, an unmanned aerial vehicle, a mobile power supply, an e-cigarette, a watch, a bracelet, smart glasses, a sweeping robot, a wireless earphone, a Bluetooth speaker, an electric toothbrush, and a chargeable wireless mouse, etc.) to perform all or part of the steps of the method described in each of the embodiments of the present disclosure. The storage medium may include various mediums capable of storing program codes, such as a USB flash disk, a mobile hard disk, a Read-Only Memory (ROM), a Random Access Memory (RAM), a magnetic disk, or a compact disc. Thus, the embodiments of the present disclosure are not limited to any specific combination of hardware and software.

Figure 5:
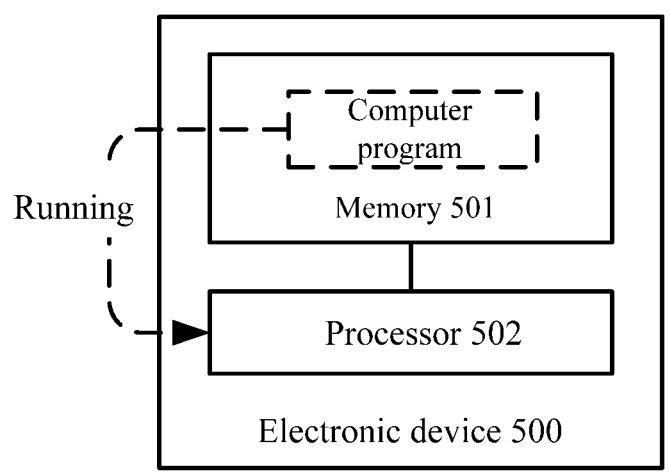
FIG. 5 is a schematic diagram illustrating a hardware entity of an electronic device according to an embodiment of the present disclosure.

Correspondingly, an embodiment of the present disclosure provides an electronic device. FIG. 5 is a schematic diagram illustrating a hardware entity of an electronic device according to an embodiment of the present disclosure. As illustrated in FIG. 5, the hardware entity of the electronic device 500 includes a memory 501 and a processor 502. The memory 501 has a computer program stored thereon, the computer program is executable on the processor 502, and the processor 502, when executing the computer program, implements steps of the method for charging provided in the above embodiments.

The Memory 501 is configured to store instructions and applications executable by the processor 502, may also cache data (e.g., image data, audio data, voice communication data, and video communication data) to be processed or already processed by the processor 502 and modules in the electronic device 500, and may be implemented by a FLASH Memory (FLASH) or a Random Access Memory (RAM).

Embodiments of the present disclosure provide a computer-readable storage medium, having a computer program stored thereon, and the computer program, when executed by a processor, implements steps of the method for charging provided in the above embodiments.

It is to be noted here that the above description of the storage medium and device embodiments, similar to the description of the method embodiments above, has similar beneficial effects as the method embodiments. For technical details not disclosed in the embodiments of the storage medium and the device of the present disclosure, reference is made to the description of the method embodiments of the present disclosure for understanding.

It should be appreciated that reference throughout the specification to "one embodiment" or "an embodiment" means that a particular feature, structure or characteristic described in connection with the embodiment is included in at least one embodiment of the present disclosure. Thus, the appearances of the phrases "in one embodiment" or "in an embodiment" in various places throughout the specification are not necessarily all referring to the same embodiment. In addition, the particular features, structures, or characteristics may be combined in any suitable manner in one or more embodiments. It should be understood that, in the various embodiments of the present disclosure, the sequence numbers of the above-mentioned steps do not imply any order of execution, and the order of execution of the steps should be determined in accordance with their functions and inherent logic, and should not constitute any limitation to the implementation process of the embodiments of the present disclosure. The above-mentioned serial numbers of the embodiments of the present disclosure are merely for description, and do not represent the advantages and disadvantages of the embodiments.

It should be noted that the terms "include," "comprise," or any other variants thereof herein, are intended to cover a non-exclusive inclusion, such that a process, method, article, or apparatus that includes a list of elements not only includes those elements but also may include other elements not expressly listed or inherent to such process, method, article, or apparatus. Without further limitation, an element identified by the phrase "includes an . . . " does not exclude the presence of other identical elements in the process, method, article, or apparatus that includes the element.

It should be understood that, in the several embodiments provided in the present disclosure, the disclosed device and method may be implemented in other manners. The above-described device embodiments are merely illustrative, for example, the division of the units is only one logical function division, and there may be other division ways in actual implementation, e.g., multiple units or components may be combined, or may be integrated into another system, or some features may be omitted, or not implemented. In addition, the coupling, direct coupling or communication connection between the components shown or discussed may be realized through some interfaces, and the indirect coupling or communication connection between the devices or units may be electrical, mechanical or in other forms.

The units described as separate parts may be or may not be physically separate, and parts displayed as units may be or may not be physical units; they can be located in one place or distributed on a plurality of network units; some or all of the units can be selected according to actual needs to achieve the purpose of the solution of the embodiment.

In addition, all functional units in the embodiments of the present disclosure may be integrated into one processing unit, or each unit may be separately regarded as one unit, or two or more units may be integrated into one unit; the integrated unit may be implemented in the form of hardware, or in the form of hardware plus software functional unit.

Those of ordinary skill in the art will understand that, all or part of the steps of implementing the method embodiments may be implemented by hardware related to program instructions, and the program may be stored in a computer-readable storage medium, and when executed, executes the steps including the method embodiments; and the aforementioned storage medium includes: various media that can store program codes, such as a removable memory device, a Read Only Memory (ROM), a magnetic disk, or a compact disk.

Alternatively, when the integrated unit described above is implemented in the form of a software functional module and sold or used as a standalone product, it can be stored in a computer-readable storage medium. Based on this understanding, the substantial technical solutions of the embodiments of the present disclosure or the part thereof that contributes to the related art can be embodied in the form of a software product. The computer software product may be stored in a storage medium and contain instructions to enable an electronic device with rechargeable battery (such as a mobile phone, a tablet computer, a laptop, an e-book, an electric vehicle, an electric bicycle, an unmanned aerial vehicle, a mobile power supply, an e-cigarette, a watch, a bracelet, smart glasses, a sweeping robot, a wireless earphone, a Bluetooth speaker, an electric toothbrush, and a chargeable wireless mouse, etc.) to perform all or part of the steps of the method described in each of the embodiments of the present disclosure. The storage medium may include various mediums capable of storing program codes, such as a removable Memory device, ROM, a magnetic disk, or a compact disk.

The methods disclosed in several method embodiments provided in the present disclosure may be combined arbitrarily without conflict to obtain new method embodiments.

The features disclosed in several product embodiments provided in the present disclosure can be combined arbitrarily without conflict to obtain new product embodiments.

The features disclosed in several method embodiments or device embodiments provided in the present disclosure can be combined arbitrarily without conflict to obtain new method or device embodiments The above merely describes embodiments of the present disclosure, but the scope of the present disclosure is not limited thereto. Those skilled in the art may easily think of variations or substitutions within the technical scope of the present disclosure, and all these shall be covered in the scope of the present disclosure. Therefore, the protection scope of the present disclosure shall be subject to the protection scope of the claims.

What is claimed is:
1. A method for charging, comprising:
determining a degree of change in charging performance of a battery corresponding to a current voltage range when the battery is in a charging state;
determining an adjustment amplitude of a current charging current based on the degree of change when the degree of change satisfies a condition;
determining a target charging current based on the adjustment amplitude and the current charging current; and
charging the battery with the target charging current.

2. The method according to claim 1, wherein said determining the degree of change in the charging performance of the battery corresponding to the current voltage range comprises:
determining a first amount of charges, with which the battery is charged within the current voltage range;
acquiring a reference amount of charges corresponding to the current voltage range; and
determining the degree of change based on the first amount of charges and the reference amount of charges.

3. The method according to claim 2, wherein when the reference amount of charges corresponding to the current voltage range is a reference amount of charges corresponding to an entirety of the current voltage range, said determining the degree of change based on the first amount of charges and the reference amount of charges comprises:
determining a first change amount of the first amount of charges relative to the reference amount of charges, and determining the first change amount as the degree of change.

4. The method according to claim 3, wherein the first change amount is a difference between the first amount of charges and the reference amount of charges, and the method further comprises:
determining that the degree of change does not satisfy the condition when an absolute value of the difference is smaller than or equal to a first threshold; and
determining that the degree of change satisfies the condition when the absolute value of the difference is greater than the first threshold.

5. The method according to claim 2, wherein when the reference amount of charges corresponding to the current voltage range is a reference amount of charges corresponding to a unit voltage within the current voltage range, said determining the degree of change based on the first amount of charges and the reference amount of charges comprises:
determining a second amount of charges, with which the battery is charged within a unit voltage based on the first amount of charges and a voltage range corresponding to the first amount of charges; and
determining a second change amount of the second amount of charges relative to the reference amount of charges, and determining the second change amount as the degree of change.

6. The method according to claim 2, further comprising:
setting a first rated amount of charges corresponding to the current voltage range as the reference amount of charges; or
setting a second rated amount of charges corresponding to a unit voltage within the current voltage range as the reference amount of charges.

7. The method according to claim 2, further comprising:
setting a third amount of charges, with which the battery is charged within the current voltage range during a historical charging process, as the reference amount of charges; or
setting a fourth amount of charges, with which the battery is charged within a unit voltage within the current voltage range during the historical charging process, as the reference amount of charges.

8. The method according to claim 7, wherein said setting the third amount of charges, with which the battery is charged within the current voltage range during the historical charging process, as the reference amount of charges comprises:
setting the amount of charges, with which the battery charged within the current voltage range during the historical charging process of a latest current adjustment, as the reference amount of charges.

9. The method according to claim 7, wherein said setting the fourth amount of charges, with which the battery is charged within the unit voltage within the current voltage range during the historical charging process, as the reference amount of charges comprises:
setting the amount of charges, with which the battery is charged within the unit voltage within the current voltage range during the historical charging process of a latest current adjustment, as the reference amount of charges.

10. The method according to claim 1, wherein said determining the adjustment amplitude of the current charging current based on the degree of change comprises:
determining an enhancement amplitude of the current charging current based on the degree of change when the degree of change indicates an enhancement of the charging performance of the battery; and
determining a reduction amplitude of the current charging current based on the degree of change when the degree of change indicates a reduction of the charging performance of the battery.

11. The method according to claim 1, further comprising:
charging the battery with the current charging current, and returning to said determining the degree of change in the charging performance of the battery corresponding to the current voltage range, when the degree of change does not satisfy the condition.

12. An electronic device, comprising a memory and a processor, wherein the memory has a computer program stored thereon, the computer program is executable on the processor, and the processor, when executing the computer program, implements steps of the method for charging according to claim 1.

13. A computer-readable storage medium, having a computer program stored thereon, wherein the computer program, when executed by a processor, implements steps of the method for charging according to claim 1.

14. An apparatus for charging, comprising:
a battery performance determining module configured to determine a degree of change in charging performance of a battery corresponding to a current voltage range when the battery is in a charging state;
an adjustment amplitude determining module configured to determine an adjustment amplitude of a current charging current based on the degree of change when the degree of change satisfies a condition;
a target charging current determining module configured to determine a target charging current based on the adjustment amplitude and the current charging current; and
a charging module configured to charge the battery with the target charging current.

15. The apparatus according to claim 14, wherein the battery performance determining module comprises:
a first determining unit configured to determine a first amount of charges, with which the battery is charged within the current voltage range;
an obtaining unit configured to obtain a reference amount of charges corresponding to the current voltage range; and
a second determining unit configured to determine the degree of change based on the first amount of charges and the reference amount of charges.

16. The apparatus of claim 15, wherein when the reference amount of charges is the reference amount of charges corresponding to the current voltage range, the second determining unit is configured to:
- determine a first change amount of the first amount of charges relative to the reference amount of charges, and determining the first change amount as the degree of change.

17. The apparatus according to claim 15, wherein when the reference amount of charges is a reference amount of charges within a unit voltage corresponding to the current voltage range, the second determining unit is configured to:
- determine a second amount of charges, with which the battery is charged within a unit voltage based on the first amount of charges and a voltage range corresponding to the first amount of charges; and
- determine a second change amount of the second amount of charges relative to the reference amount of charges, and determining the second change amount as the degree of change.

18. The apparatus according to claim 15, further comprising a reference charge amount setting module configured to:
- setting a first rated amount of charges corresponding to the current voltage range as the reference amount of charges; or
- setting a second rated amount of charges corresponding to a unit voltage within the current voltage range as the reference amount of charges.

19. The apparatus according to claim 15, further comprising a reference charge amount setting module configured to:
- setting a third amount of charges, with which the battery is charged within the current voltage range during a historical charging process, as the reference amount of charges; or
- setting a fourth amount of charges, with which the battery is charged within a unit voltage within the current voltage range during the historical charging process, as the reference amount of charges.

20. The apparatus according to claim 14, wherein the adjustment amplitude determining module is configured to:
- determine an enhancement amplitude of the current charging current based on the degree of change when the degree of change indicates an enhancement of the charging performance of the battery; and
- determine a reduction amplitude of the current charging current based on the degree of change when the degree of change indicates a reduction of the charging performance of the battery.

* * * * *